(12) United States Patent
Liu

(10) Patent No.: US 11,878,611 B2
(45) Date of Patent: Jan. 23, 2024

(54) RETAINING DEVICE, BASE AND CARRIER

(71) Applicant: BAMBINO PREZIOSO SWITZERLAND AG, Steinhausen (CH)

(72) Inventor: Zujian Liu, Steinhausen (CH)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 5 days.

(21) Appl. No.: 17/666,097

(22) Filed: Feb. 7, 2022

(65) Prior Publication Data
US 2022/0250514 A1    Aug. 11, 2022

(30) Foreign Application Priority Data
Feb. 8, 2021   (CN) .......................... 202110172931.X

(51) Int. Cl.
*B60N 2/28*   (2006.01)

(52) U.S. Cl.
CPC ......... *B60N 2/2884* (2013.01); *B60N 2/2887* (2013.01)

(58) Field of Classification Search
CPC ............................. B60N 2/2884; B60N 2/2887
See application file for complete search history.

(56) References Cited

U.S. PATENT DOCUMENTS

| 8,226,162 | B2 * | 7/2012 | Campbell | .......... B60N 2/42736 |
| | | | | 297/250.1 |
| 9,315,123 | B2 * | 4/2016 | Guo | ...................... B60N 2/2806 |
| 2007/0013215 | A1 * | 1/2007 | Browne | ............... B60N 2/2806 |
| | | | | 297/250.1 |
| 2008/0136224 | A1 * | 6/2008 | Malapati | ................. B60R 22/18 |
| | | | | 297/216.11 |

(Continued)

FOREIGN PATENT DOCUMENTS

| CN | 104044488 A | 9/2014 |
| CN | 106394337 A | 2/2017 |
| CN | 109823242 A | 5/2019 |

(Continued)

OTHER PUBLICATIONS

Office Action issued in counterpart German Patent Application No. 10 2022 102 841.0, dated May 17, 2023. English translation included.

(Continued)

*Primary Examiner* — David R Dunn
*Assistant Examiner* — Tania Abraham
(74) *Attorney, Agent, or Firm* — Volpe Koenig

(57) ABSTRACT

The present disclosure provides a retaining device for a carrier, which includes a base support assembly connected to and supporting a base of the carrier, a retaining assembly configured to secure the carrier to a vehicle seat, a fastening rod provided on and movable with the base support assembly, a slider provided within the retaining assembly and engaged with the fastening rod such that the fastening rod is (Continued)

able to move the slider, and a cushioning assembly engaged with the slider. The cushioning assembly provides cushioning to the slider when an impact force from the slider applied to the cushioning assembly reaches a predetermined value, allowing for a movement of the slider from a first position to a second position.

20 Claims, 7 Drawing Sheets

(56) References Cited

U.S. PATENT DOCUMENTS

2010/0109395 A1* 5/2010 Ruthinowski ............. F16F 7/09
267/140.13

FOREIGN PATENT DOCUMENTS

| CN | 109955747 A | 7/2019 | |
|---|---|---|---|
| DE | 60121282 T2 | 7/2007 | |
| EP | 2586651 A1 * | 5/2013 | ........... B60N 2/2821 |
| EP | 2594427 A1 * | 5/2013 | ........... B60N 2/2821 |
| EP | 3521104 A1 * | 8/2019 | ........... B60N 2/2821 |
| EP | 3521104 A1 | 8/2019 | |
| WO | 2013163911 A1 | 11/2013 | |

OTHER PUBLICATIONS

Office Action issued in Taiwanese counterpart Application No. 111104479, dated May 23, 2023. English translation included.

* cited by examiner

RETAINING DEVICE, BASE AND CARRIER

CROSS REFERENCE TO RELATED APPLICATIONS

This application claims the priority of Chinese Patent Application No. 202110172931.X, filed Feb. 8, 2021, the content of which is hereby incorporated by reference in its entirety.

TECHNICAL FIELD

The present disclosure relates to a carrier, a retaining device for the carrier, and a base for supporting the carrier.

BACKGROUND

Safety seats are usually installed on a vehicle seat to prevents children from being hurt by securely holding the children on the safety seat, thus improving the safety of children in the vehicle. Although the existing safety seats have improved the safety of children in the vehicle to a certain extent, in extreme cases, such as in the case of a collision or emergency braking, however, the large impact may still hurt children.

SUMMARY

One aspect of the disclosure provides a retaining device for a carrier, which includes a base support assembly connected to and supporting a base of the carrier, a retaining assembly configured to secure the carrier to a vehicle seat, a fastening rod provided on the base support assembly and movable along with the base support assembly, a slider provided within the retaining assembly and engaged with the fastening rod such that the fastening rod is able to move the slider, and a cushioning assembly engaged with the slider. The cushioning assembly provides cushioning to the slider when an impact force from the slider applied to the cushioning assembly reaches a predetermined value, allowing for a movement of the slider from a first position to a second position.

Another aspect of the disclosure provides a base for a carrier, which includes a retaining device. The retaining device includes a base support assembly connected to and supporting the base of the carrier, a retaining assembly configured to secure the carrier to a vehicle seat, a fastening rod provided on the base support assembly and movable along with the base support assembly, a slider provided within the retaining assembly and engaged with the fastening rod such that the fastening rod is able to move the slider, and a cushioning assembly engaged with the slider. The cushioning assembly provides cushioning to the slider when an impact force from the slider applied to the cushioning assembly reaches a predetermined value, allowing for a movement of the slider from a first position to a second position.

Yet another aspect of the disclosure provides a carrier which includes a safety seat. The safety seat includes a base. The base includes a retaining device which includes a base support assembly connected to and supporting the base, a retaining assembly configured to secure the safety seat to a vehicle seat, a fastening rod provided on the base support assembly and movable along with the base support assembly, a slider provided within the retaining assembly and engaged with the fastening rod such that the fastening rod is able to move the slider, and a cushioning assembly engaged with the slider. The cushioning assembly provides cushioning to the slider when an impact force from the slider applied to the cushioning assembly reaches a predetermined value, allowing for a movement of the slider from a first position to a second position.

Details of one or more embodiments of the disclosure are presented with the accompanying drawings and description below. Other features, objects and advantages of the disclosure will become apparent from the specification, the accompanying drawings, and the claims.

BRIEF DESCRIPTION OF THE DRAWINGS

To illustrate the technical solutions of the embodiments of the disclosure, the accompanying drawings for describing the embodiments or the prior art are introduced briefly in the following. Apparently, the accompanying drawings in the following description are only some embodiments of the disclosure, and persons of ordinary skill in the art can derive other drawings from the accompanying drawings without creative efforts.

DETAILED DESCRIPTION

Figure 1:
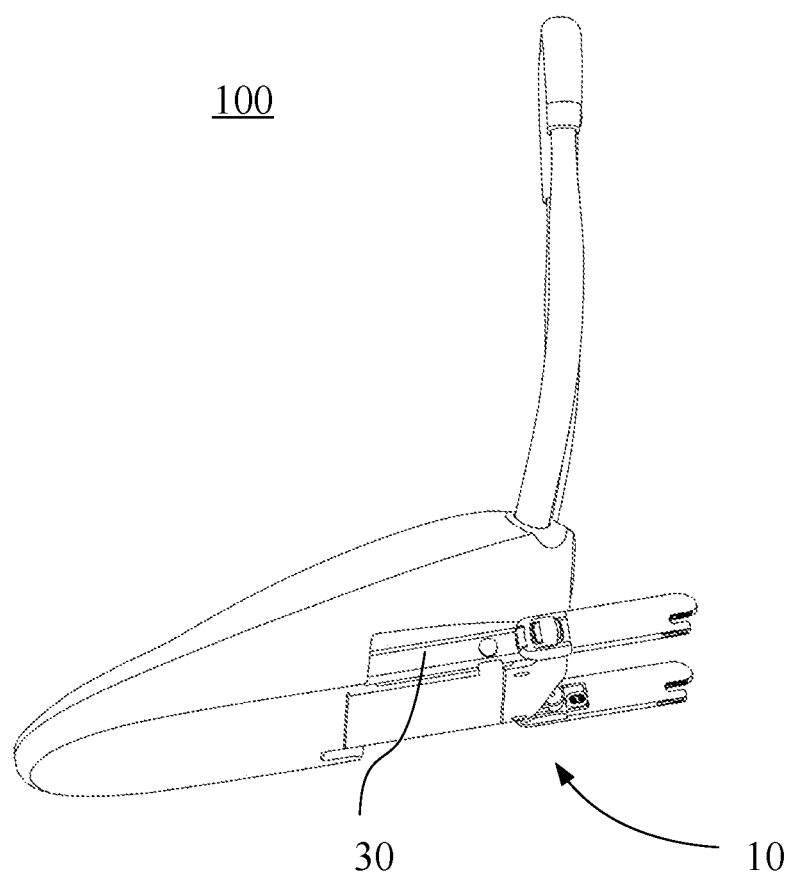
FIG. 1 is a perspective view of a base of an embodiment of the disclosure.

Implementation of the disclosure are elaborated below with reference to the accompanying drawings, to enable the objectives, advantages and features of the disclosure more comprehensible. Specific details are described below to enable persons skilled in the art to fully understand the disclosure. However, the disclosure may be implemented in other manners besides those described herein. Persons skilled in the art can make such improvements without departing from the concept of the disclosure. Therefore, the disclosure is not limited by the embodiments disclosed in the following.

It should be understood that, in the description of the disclosure, terms such as "center", "longitudinal", "transverse", "length", "width", "thickness", "front", "up", "down", "front", "back", "left", "right", "vertical", "horizontal", "top", "bottom", "inside", "clockwise", "counter-clockwise", "axial", "radial", "circumferential" and the like indicate orientation or positional relationships based on the orientation or positional relationships shown in the accompanying drawings, and are intended only to facilitate and simplify the description of the disclosure, not to indicate or imply that the devices or elements must have a particular orientation, be constructed and operate in a particular orientation, and therefore are not to be construed as a limitation of the disclosure.

In the disclosure, unless otherwise expressly specified and defined, terms such as "mount", "connect", "interconnect", "secure", "dispose" and other terms shall be understood in a broad way. For example, unless otherwise expressly defined, "connection" may be a fixed connection, detachable connection, or integral connection; it may be a mechanical connection, an electrical connection; it may be direct connection, or indirect connection through an intermedium; and it may be an internal connection of two components or an interaction between two components. For example, when an element is described as "fixed" or "disposed" to another element, it may be directly on the other element or there may be an intermedium element. For those of ordinary skill in the art, the specific meaning of the above terms in the context of the disclosure can be understood on a case-by-case basis.

In the disclosure, unless otherwise expressly specified and defined, if a first member is described to be on or under a second member, there may be direct contact between the first and second members, or indirect contact between the first and second members through an intermedium. Besides, if a first member is described to be above a second member, it may mean that the first member is rightly above or diagonally above the second member, or that the first member is horizontally higher above the second member. If a first member is described to be below a second member, it may mean that the first member is right below or diagonally below the second member, or that the first member is horizontally lower than the second member.

One aspect of the disclosure provides a retaining device for a carrier such as a safety seat, which includes a base support assembly connected to and supporting a base of the carrier, a retaining assembly configured to secure the carrier to a vehicle seat, a fastening rod provided on the base support assembly and movable along with the base support assembly, a slider provided within the retaining assembly and engaged with the fastening rod, and a cushioning assembly. The fastening rod is able to move the slider in, for example, a front-to-back direction. The cushioning assembly is engaged with the slider to provide cushioning to the slider when an impact force from the slider reaches a predetermined value, and thus allows for a movement of the slider from a first position to a second position. Another aspect of the disclosure provides a base for a carrier. The base includes a retaining device according to various embodiments of the disclosure.

Another aspect of the disclosure provides a carrier. The carrier includes a safety seat which includes a base according to various embodiments of the disclosure.

According to the embodiments of the disclosure, the carrier may be a safety seat. Aspects, embodiments and implementations of the disclosure will be described in detail below by taking the safety seat as an example.

When a vehicle is in an emergency such as emergency braking, collision, etc., due to inertia, a strong impact is generated between children in the vehicle and the safety seat secured on the vehicle seat, which may affect the safety of the children or bring a poor riding experience. According to some embodiments of the disclosure, when this impact reaches a certain level, for example, equal to or greater than a predetermined value, the retaining device provides cushioning to the slider, and thus provides cushioning to a base of the safety seat connected to the slider and to the entire seat, which reduces the impact on the child by the safety seat and enhances the protection to the child.

Figure 2:
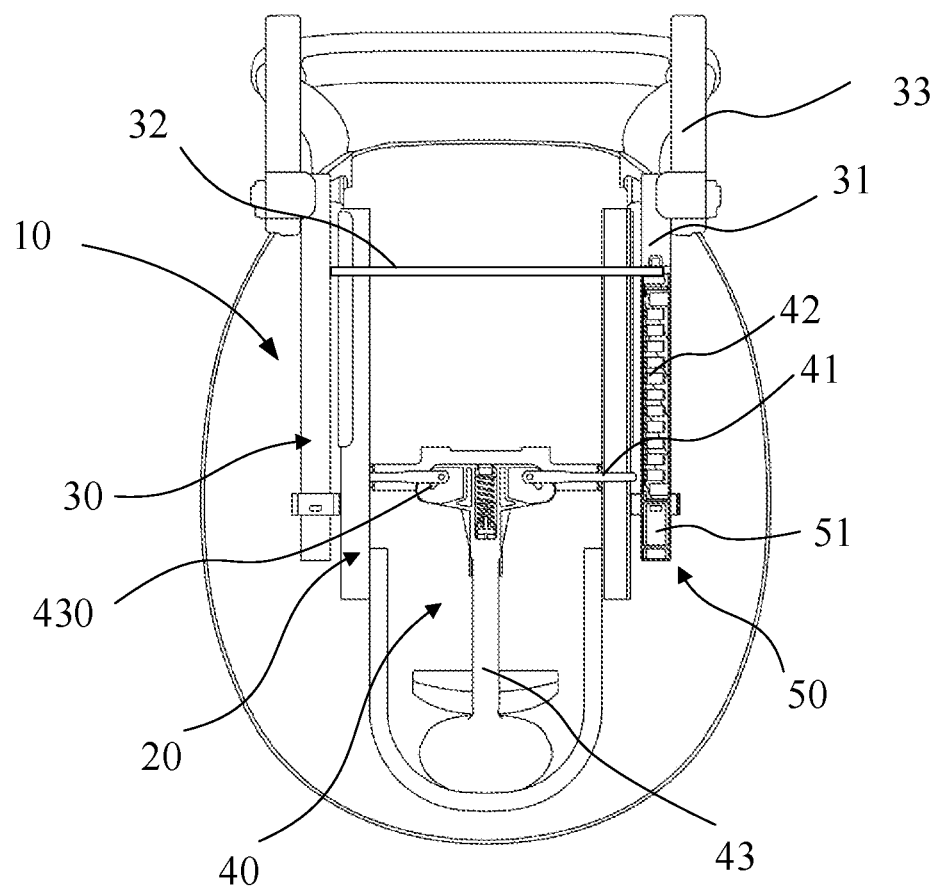
FIG. 2 is a bottom view of a base of an embodiment of the disclosure.
Figure 3:
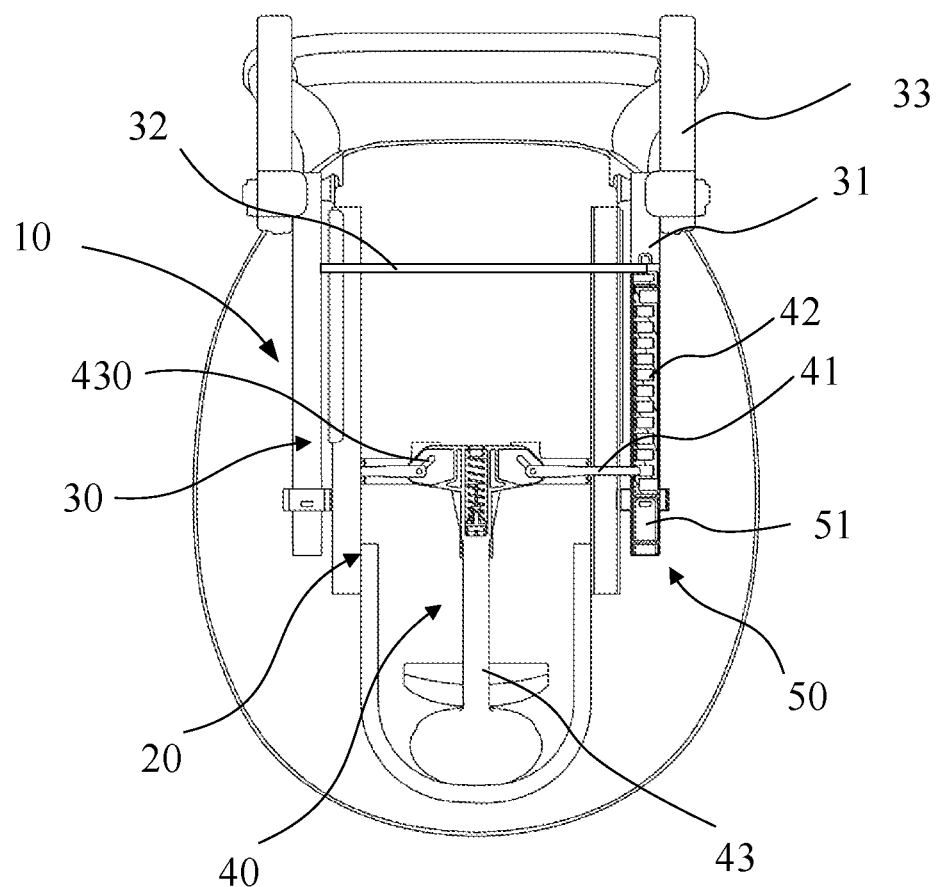
FIG. 3 is a bottom view of the base in FIG. 2 in another state.

The retaining device of the disclosure will be described in detail in connection with the structures in the embodiments. FIG. 1 is a perspective view of a base 100 for a carrier of an embodiment of the disclosure. FIGS. 2-3 are bottom views of the base 100 of an embodiment of the disclosure, showing a retaining device 10 of the base 100. It should be understood by those with ordinary skills in the art that the base of the disclosure may be suitable for, but not limited to, supporting a carrier such as a safety seat. In other embodiments, the structure disclosed below may also be implemented directly in a carrier. According to the embodiment shown in FIGS. 1-3, the base 100 has a retaining device 10 which includes a base support assembly 20 and a retaining assembly 30. The base support assembly 20 is connected to and supports the base 100, and the retaining assembly 30 extends out of the base 100 to be connected to and secured with a vehicle seat. The retaining device 10 further includes an adjustment assembly 40 and a cushioning assembly 50. The adjustment assembly 40 is used to adjust the position of the base support assembly 20 with respect to the retaining assembly 30, and the cushioning assembly 50 is used to provide cushioning to the safety seat.

Specifically, the retaining assembly 30 includes a pair of parallel retaining rods 31 on each side of the base 100, a synchronizing rod 32 connecting the two retaining rods 31 to synchronize the movement of the two retaining rods 31, and locking members 33 fixedly connected to the ends of the retaining rods 31 respectively. The locking member 33 is ISOFIX compliant to engage with a corresponding interface on the vehicle seat to lock the base 100 to the vehicle seat. It should be understood that, in other embodiments, the safety seat of the disclosure may be securely connected to the vehicle seat by other interface standards such as LATCH. Also referring to FIGS. 4-6, the retaining rods 31 are each provided with a slideway 310 for accommodating sliders and for the sliders to slide therewithin (will be described below).

Figure 4:
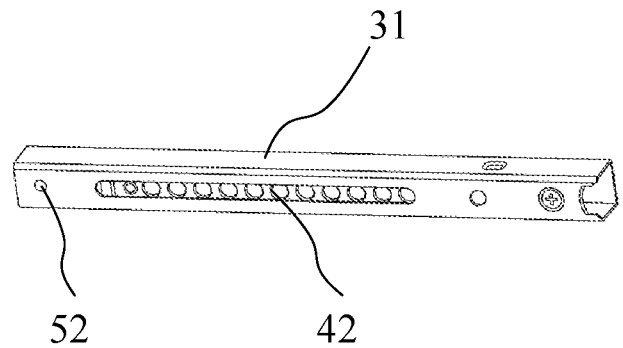
FIG. 4 is a partially assembled view of a retaining device of an embodiment of the disclosure.
Figure 5:
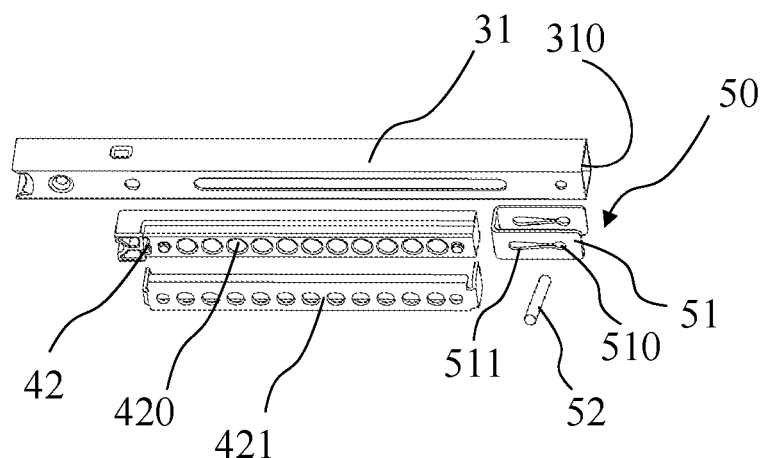
FIG. 5 is a partially exploded view of a retaining device of an embodiment of the disclosure.
Figure 6:
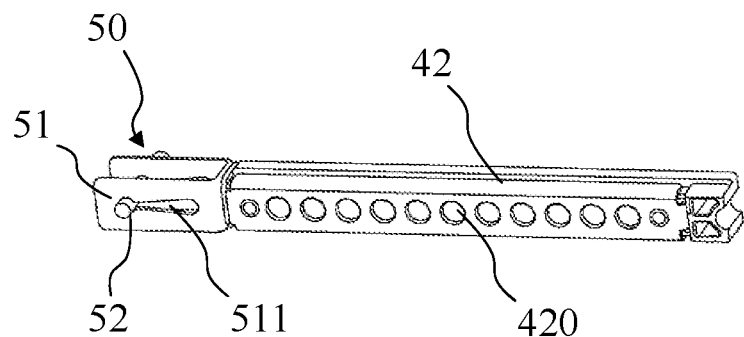
FIG. 6 is another partially assembled view of a retaining device of an embodiment of the disclosure.
Figure 7:
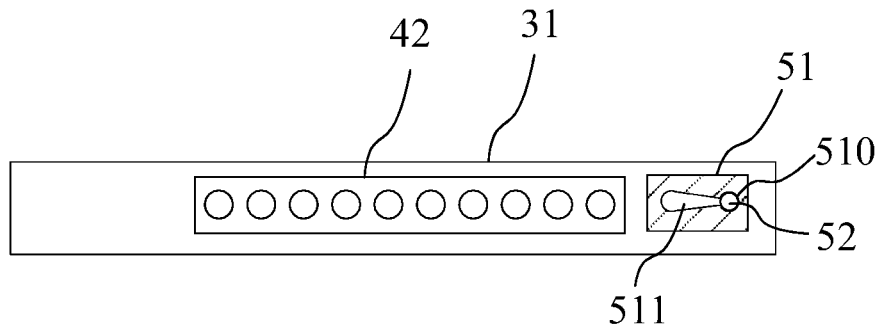
FIG. 7 is a schematic diagram of a retaining device of an embodiment of the disclosure.

The adjustment assembly 40 is used to adjust the front-to-back position of the base support assembly 20 with respect to the retaining assembly 30. The adjustment assembly 40 includes fastening rods 41 connected to the base support assembly 20, a slider 42 provided within the retaining assembly 30 and engaged with the fastening rod 41, and an operative member 43. The fastening rod 41 is movable along with the base support assembly, and is driven by the operative member 43 to perform a reciprocating movement in a direction perpendicular to the cushioning direction between a locked position and an unlocked position. In the locked position, the fastening rod 41 is inserted into the slider 42, and the base support assembly 20 and the retaining assembly 30 are fixed relative to each other. In the unlocked position, the fastening rod 41 is disengaged from the slider 42, and the base support assembly 20 is then able to slide with respect to the retaining assembly 30 in a front-to-back direction. The slider 42 is provided with a plurality of adjustment holes 420 arranged in the cushioning direction for insertion of an end of the fastening rod 41. In the embodiment as shown in FIGS. 3-5, the slider 42 further includes a reinforcing member 421 that enhances the strength of the slider 42.

Particularly referring to FIGS. 2-3, when the safety seat needs to be adjusted, the fastening rod 41 is moved to the unlocked position by, for example, pulling the operative member 43. The base 100 of the safety seat can be then moved to a desired position, after which the operative member 43 is released such that one end of the fastening rod 41 is inserted into a corresponding adjustment hole 420 of the slider 42. As such, the position of the base support assembly 20 with respect to the retaining assembly 30 in the front-to-back direction has been adjusted, i.e., the position of the safety seat on the vehicle seat has been adjusted.

In the embodiment shown in FIGS. 2-3, the operative member 43 includes a guide slot 430 connected to the fastening rod 41. The guide slot 430 is inclined, and one end of the fastening rod 41 is connected to and constrained in the guide slot 430. As the operative member 43 moves in the front-to-back direction, the fastening rod 41 moves along the guide slot 430 in a lateral direction perpendicular to the fronts to-back direction to be inserted into or disengaged from the slider 42. It should be understood that, in other embodiments, an adjustment assembly of a different configuration may be used to drive the fastening rod. For example, a pivotable drive rod is provided between the operative member 43 and the fastening rod 41, which acts as a lever that converts the movement of the operative member 43 in the front-to-back direction to the movement of the fastening rod 41 in the lateral direction.

Therefore, the adjustment assembly of the disclosure is not limited to the particular configuration as described above, but includes all existing adjustment assemblies that can drive the fastening rod 41.

Specially, the base 100 provided by the disclosure provides protection for children in the event of, for example, a vehicle collision or emergency braking. In some embodiments, the cushioning assembly 50 is located in front of the slider 42 in the cushioning direction of the slider 42 such that the slider 42 may abut against or otherwise interact with the cushioning assembly 50. It should be noted that "abutting" or "abutting against" as described herein or in the following embodiments includes not only direct abutting of the slider 42 against the cushioning assembly 50 in normal situations, but also includes the case that the slider 42 and the cushioning assembly 50 are apart away from each other but get to abut against each other when one of them slides relative to the other, in some situations.

In the embodiments shown in FIGS. 2-7, the cushioning assembly 50 is provided within the retaining rod 31 on each side of the base 100, and also provided in front of the slider 42. The cushioning assembly 50 includes a cushioning member 51 and a pin 52 inserted in the cushioning member 51. The cushioning member 51 has a symmetrical U-shaped structure with a hole 510 on each side for insertion of the pin 52 and a cushioning slot 511 in communication with the hole 510. The width of the cushioning slot 511 is smaller than the diameter of the pin 52. The slider 42 abuts against the cushioning member 51, and the pin 52 is inserted into and thus secured to the retaining rod 31. It should be understood that the pin 52 may be otherwise secured to the retaining assembly 30 in other ways. In the event that the impact force from the slider 42 applied to the cushioning member 51 does not reach a specific value such as a predetermined value, the pin 52 can be stably maintained in the hole 510. In other words, the slider 42 is located in a first position without relative displacement and the base support assembly 20 does not move with respect to the retaining assembly 30. When the impact force from the slider 42 applied to the cushioning member 51 reaches the predetermined value, the pin 52 breaks through the hole 510 where it is located and is displaced along the cushioning slot 511. The movement of the pin 52 squeezes the material on both sides of the cushioning slot 511 to deform it, and the deformation in turn provides cushioning to the movement of the slider 42. The displacement of the pin 52 in the cushioning slot 511 allows the slider 42 to move forward within the slideway 310 to a second position, and the amount of the forward movement depends on the structure and material of the cushioning assembly and the magnitude of the impact force resulted from, for example, an emergency braking or collision. The movement of the slider 42 and the damping effect ensure that the slider 42 and the entire base support assembly 20 connected to the slider 42 by the adjustment assembly 40 will not stop abruptly in the event of, for example, an emergency braking or collision, thus providing cushioning to the base support assembly 20 and the entire safety seat.

In the above embodiment, the width of the cushioning slot 511 is smaller than the diameter of the pin 52 to generate necessary squeezing and damping. It should be understood that it does not necessarily require that the width of the cushioning slot 511 must be smaller than the diameter of the pin 52 throughout the entire length. A cushioning effect can be achieved, as long as the width of at least a section of the cushioning slot 511 is smaller than the diameter of the pin 52. Furthermore, according to the illustrated embodiment, the width of the cushioning slot 511 varies progressively along the length. For example, the cushioning slot 511 has a progressively larger width in the moving direction of the pin 52. It should be understood that in other embodiments, the width of the cushioning slot 511 may remain constant.

Figure 8:
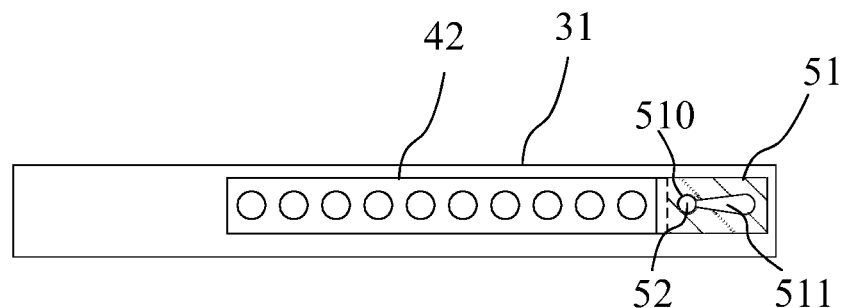
FIG. 8 is a schematic diagram of a retaining device of another embodiment of the disclosure.

FIG. 8 is a schematic view of another implementation of the cushioning assembly 50 in the above embodiment. The difference with the above described implementation is that the cushioning assembly 50 is placed in reverse, i.e., the slider 42 abuts against the pin 52, and the cushioning member 51 abuts against the retaining rod 31. When the impact force from the slider 42 applied to the pin 52 reaches a predetermined value, the pin 52 breaks through the hole 510 and is displaced along the cushioning slot 511, while squeezing the material on both sides of the cushioning slot 511 to deform it. Similarly, the relative displacement provides cushioning to the base support assembly and the entire safety seat.

Figure 9:
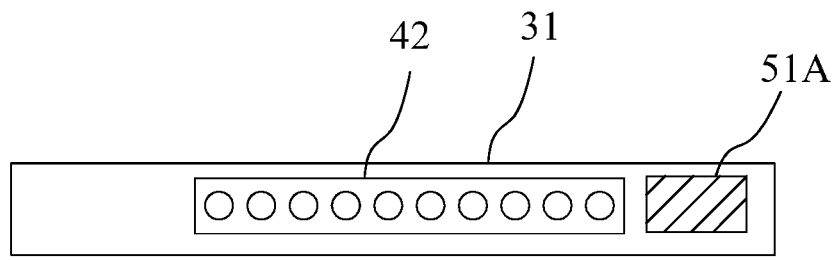
FIG. 9 is a schematic diagram of a retaining device of another embodiment of the disclosure.

FIG. 9 is a schematic diagram of a retaining device according to another embodiment of the disclosure. Unlike the previous embodiments, the cushioning assembly includes a flexible cushioning member 51A, which is located in front of the slider 42 in the cushioning direction of the slider 42 so that the slider 42 abuts against the cushioning member 51A. The cushioning member 51A is configured to be deformed when the impact force from the slider 42 reaches a predetermined value, thereby providing cushioning to the slider 42. In a specific embodiment, the cushioning member 51A is made of a flexible material that is non-recoverable or recovers slowly, and thus, the shape of the cushioning member 51A will not recover or recover slowly after the flexible material deforms. These materials may be, for example, triethyl phosphate (TEP), rubber, etc.

Figure 10:
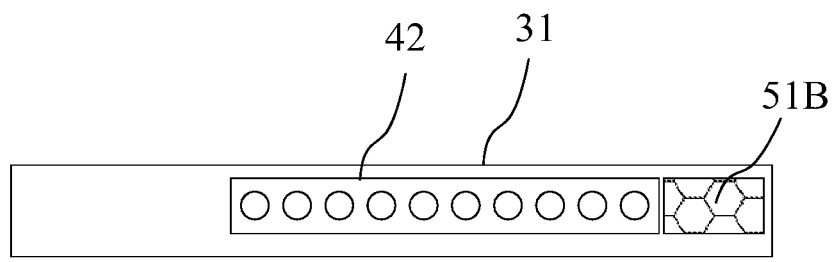
FIG. 10 is a schematic diagram of a retaining device of another embodiment of the disclosure.

FIG. 10 is a schematic diagram of a retaining device according to another embodiment of the disclosure. Unlike the previous embodiments, the cushioning assembly includes a cushioning member 51B, which is located in front of the slider 42 in the cushioning direction of the slider 42 and configured to collapse when the impact force from the slider 42 reaches a predetermined value. For example, the cushioning member 51B is made of a brittle resin, and has a honeycomb structure, for example.

Figure 11:
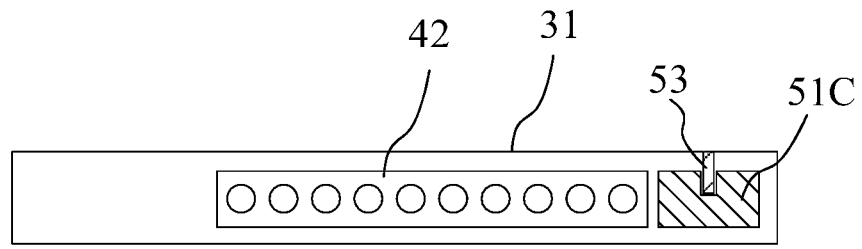
FIG. 11 is a schematic diagram of a retaining device of another embodiment of the disclosure.

FIG. 11 is a schematic diagram of the retaining device according to another embodiment of the disclosure. Unlike the previous embodiments, the cushioning assembly includes a cushioning member 51C and a snap 53 inserted into the cushioning member 51C. The snap 53 is fixed to the retaining assembly 30, for example, the snap 53 is fixed directly to the retaining rod 31. When the impact force from the slider 42 reaches a predetermined value, the snap 53 is broken by the impact of the cushioning member 51C and separated away from the retaining rod 31, which allows the slider 42 to move forward, thereby providing cushioning to the safety seat. In a modified embodiment, the snap 53 may be located in front of the cushioning member 51C. Alternatively, the snap 53 may be made of a brittle material with a certain strength. In another modified embodiment, the snap 53 may abut directly against the slider 42, thereby eliminating the need for the cushioning member 51C.

Figure 12:
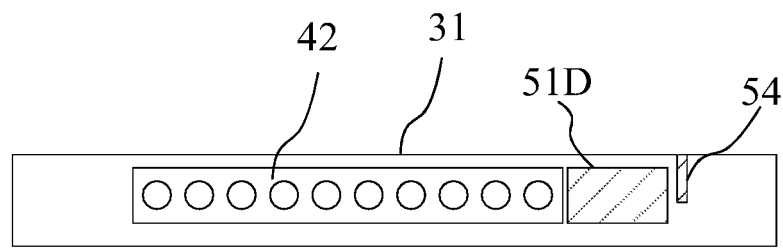
FIG. 12 is a schematic diagram of a retaining device of another embodiment of the disclosure.
Figure 13:
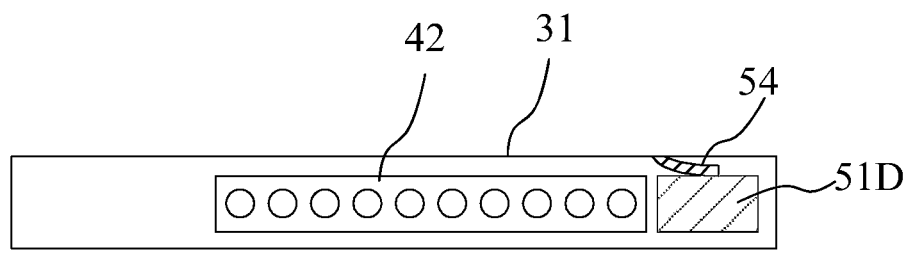
FIG. 13 is a schematic diagram of the retaining device in FIG. 12 in another state.

FIGS. 12 and 13 are schematic diagrams of a retaining device according to another embodiment of the disclosure. Unlike the previous embodiments, the cushioning assembly includes a cushioning member 51D and a stopper 54 abutting against the cushioning member 51D. The stopper may be, for example, an elastic tab that is fixed to the retaining rod 31 and located in front of the cushioning member 51D. The cushioning member 51D abuts against the stopper 54, and when the impact force from the slider 42 reaches a predetermined value, the stopper 54 deforms to release the slider 42 such that the slider 42 can move forward from a first position to a second position, thereby providing cushioning to the safety seat. The second position depends on the magnitude of the impact force and the properties of the stopper 54, such as material, structure and elasticity.

Figure 14:
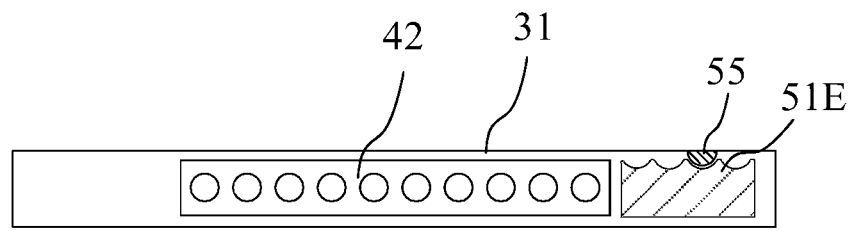
FIG. 14 is a schematic diagram of a retaining device of another embodiment of the disclosure.

FIG. 14 is a schematic diagram of the retaining device according to another embodiment of the disclosure. Unlike the previous embodiments, the cushioning assembly includes a cushioning member 51E and a protrusion 55 fixed to the retaining rod 31 and engaged with the cushioning member 51E. In the illustrated embodiment, the cushioning member 51E has a wavy surface and the protrusion 55 has an arcuate surface to abut against the wavy surface. When the impact force from the slider 42 is less than a predetermined value, the cushioning member 51E cannot move due to the interference between the protrusion 55 and the cushioning member 51E. When the impact force reaches a predetermined value, the protrusion 55 slides on the wavy surface, which generates a damping effect and thus provides cushioning to the slider 42 and the base 100. In addition to the wavy surface, the surface of the cushioning member 51E may has a flat structure or other structures that are able to generate a squeezing force between the cushioning member 51E and the protrusion 55. The squeezing force determines a threshold of the impact force that causes relative sliding, and provides a damping effect during the relative sliding.

Figure 15:
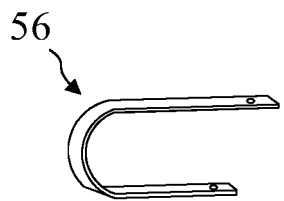
FIG. 15 is a perspective view of a collapsing member of a retaining device of another embodiment of the disclosure.
Figure 16:
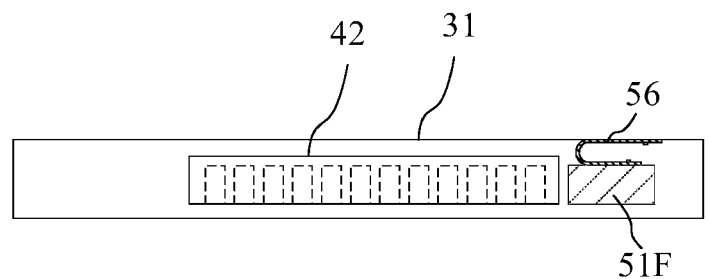
FIG. 16 is a schematic diagram of the retaining device having the collapsing member shown in FIG. 15.

Referring to FIGS. 15-16, where FIG. 16 is a schematic diagram of a retaining device according to another embodiment of the disclosure, unlike the previous embodiments, the cushioning assembly includes a collapsing member 56. FIG. 15 is a perspective view of the collapsing member 56. The collapsing member 56 may be of a metallic material, and in the illustrated embodiment, the collapsing member 56 has a U-shaped structure. When the impact force from the slider 42 reaches a predetermined value, the collapsing member 56 deforms plastically to absorb energy, thus providing cushioning to the safety seat. In a specific implementation, the cushioning assembly further includes a cushioning member 51F located in front of the slider 42 and abutting against the slider 42. One end of the collapsing member 56 is fixed to the cushioning member 51F and the other end is fixed to the retaining assembly 30. In another embodiment, the slider 42 may be directly connected to the collapsing member 56 without the cushioning member 51F.

Figure 17:
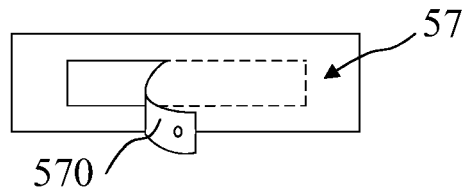
FIG. 17 is a perspective view of a collapsing member of a retaining device of another embodiment of the disclosure.
Figure 18:
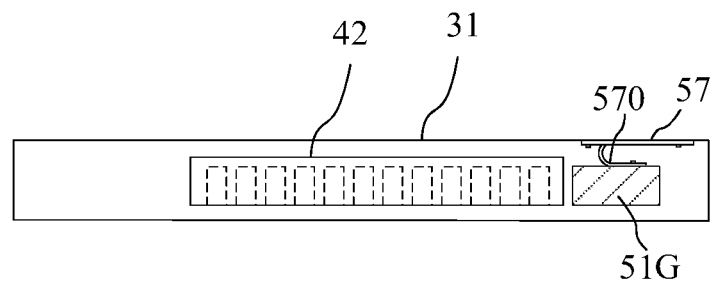
FIG. 18 is a schematic diagram of the retaining device having the collapsing member shown in FIG. 17.

Referring to FIG. 17 and FIG. 18, where FIG. 18 is a schematic diagram of a retaining device according to another embodiment of the disclosure. Unlike the previous embodiments, the cushioning assembly includes a torn member 57 fixed to, for example, the retaining rod 31. FIG. 17 is a perspective view of the torn member 57. The torn member 57 may be of a metallic material and has a torn piece 570. The torn piece 570 may be formed integrally with the torn member 57 and has tearing lines machined along its perimeter. The tearing lines facilitates tearing the torn piece 570 from the torn member 57. In a specific embodiment, the cushioning assembly further includes a cushioning member 51G located in front of the slider 42 and abutting against the slider 42. One end of the torn piece 570 is fixed to the cushioning member 51G. When the impact force from the slider 42 reaches a predetermined value, the torn piece 570 is torn from the torn member 57, while providing an energy-absorbing effect and thus providing cushioning to the safety seat. In an alternative embodiment, the end of the torn piece 570 can be fixed directly to the slider 42, eliminating the need for the cushioning member 51G.

In another embodiment (not shown), the cushioning assembly includes a cushioning member, an electronic lock for locking the cushioning member, and a detection assembly. The cushioning member abuts against the slider. The detection assembly is used to detect impact forces resulting from an emergency braking or collision, e.g. the impact forces applied to the cushioning member. Alternatively, the detection assembly may also detect acceleration due to the emergency braking or collision, e.g. the acceleration of the base 100 or the vehicle. The electronic lock is configured to release the cushioning member when the impact force and/or acceleration detected by the detection assembly reaches a predetermined value, thereby providing cushioning to the safety seat.

According to various embodiments, the slider 42 may continue to move forward if the impact force reaches a predetermined value so as to achieve a cushioning effect. Further, according to some of these embodiments, the cushioning assembly 50 may provide damping as the slider 42 continues to slide forward, thereby achieving a better cushioning effect. According to these embodiments, the damping may come from frictional forces due to squeezing or elastic pressure, resistance of the cushioning member, resistance from deformation, resistance from breakage of material, etc.

According to the embodiments, the cushioning assembly 50 is configured such that the slider 42 can be moved from a first position to a second position to achieve cushioning. According to some of embodiments, the cushioning assembly 50 is further configured such that the slider 42 can stay in the second position after it moves to the second position, and will not move rapidly back and forth between the first position and the second position so as to prevent children from being injured, thus further ensuring the safety of the children in the vehicle and improving the riding experience.

According to the various embodiments, the retaining device 10 includes an adjustment assembly 40, and the adjustment assembly 40 includes an operative member 43 and a fastening rod 41. The operative member 43 drives the fastening rod 41 to lock or unlock the slider 42, thereby realizing the position adjustment of the base support assembly 20 with respect to the retaining assembly 30, as well as realizing the movement of the slider 42 driven by the base support assembly 20. In addition, combined with the cushioning effect described above, it should be understood that the cushioning mechanism can also be applied to safety seats that do not have a position adjustment function, i.e., the safety seats that do not have an adjustment assembly. For example, the fastening rod may be fixed directly to the base support assembly and connected to a slider within the retaining assembly. As such, in an emergency situation such as an emergency braking or collision, the slider abuts against the cushioning assembly, and when the impact force from the slider reaches a predetermined value, the cushioning assembly provides a cushioning effect to the safety seat in various ways as described above. It should be noted that the fastening rod as described in the above embodiments is used for transmitting power between the base support assembly and the slider, and in some embodiments for the position adjustment of the base, so the fastening rod is not limited to a specific structure, but may be of any structure that can achieve the above functions.

In the described embodiments, the predetermined value for determining whether cushioning effect of the cushioning assembly occurs can be determined by, for example, the structure or material of the cushioning assembly. For example, the predetermined value can be determined to be between 1000N-5000N, as needed. The cushioning assembly functions when the impact force reaches or exceeds this predetermined value. It should be noted that the predetermined value in the claims and specification of this application may be a pre-determined value by a person, and the cushioning assembly can be then designed based on the value, or the predetermined value may be an objectively determined value depending on an already designed cushioning assembly.

In addition, according to the various embodiments, the cushioning assembly 50 is located within the retaining rod 31 on each side. It should be understood that the cushioning assembly 50 may also be in other locations of the retaining assembly 30, or within only one of the retaining rods 31 of the retaining assembly 30.

Another aspect of the disclosure provides a safety seat including a retaining device as described in the previous embodiments. By the retaining device, cushioning of the safety seat in emergency situations is realized, thus ensuring the safety of children in the vehicle.

The technical features of the above described embodiments can be combined in any way according to the actual situations. For simplification purpose, not all possible combinations of the technical features in the above described embodiments are described. however, as long as there is no contradiction in the combination of these technical features, they should be considered to fall with the scope of the present disclosure.

Only several embodiments of the present disclosure are described with more specific and detailed descriptions, but they are not intended to be a limitation of the scope of the patent invention. It should be noted that for a person of ordinary skill in the art, a number of modifications and improvements can be made without departing from the conception of the present invention, which all belong to the patent scope of the present invention. Therefore, the patent scope of the present invention shall be subject to the attached claims.

What is claimed is:

1. A retaining device for a carrier, the retaining device comprising:
   a base support assembly connected to and supporting a base of the carrier;
   a retaining assembly configured to secure the carrier to a vehicle seat, the retaining assembly comprising a retaining rod;
   a slider received in the retaining rod;
   a fastening rod provided on the base support assembly and configured to be operatively engaged with or disengaged from the slider, wherein when the fastening rod is engaged with the slider, movement of the base support assembly relative to the slider is restricted,
   and when the fastening rod is disengaged from the slider, the base support assembly is movable relative to the slider so that a position of the base support assembly with regard to the retaining assembly is adjustable; and
   a cushioning assembly arranged in the retaining rod, and abutting against an end of the slider,
   wherein the slider is arranged at a first position in the retaining rod until an impact force from the slider applied to the cushioning assembly reaches a predetermined value, and the cushioning assembly is configured to allow the slider to slide in the retaining rod from the first position to a second position when the impact force from the slider applied to the cushioning assembly reaches or exceeds the predetermined value, and provide damping for the sliding of the slider between the first position and the second position.

2. The retaining device of claim 1, wherein the cushioning assembly comprises a cushioning member and a pin inserted into the cushioning member, the cushioning member having a hole for insertion of the pin and a cushioning slot in communication with the hole, the cushioning slot having a width smaller than a diameter of the pin, and
   wherein the pin slides from the hole into the cushioning slot when the impact force from the slider reaches the predetermined value.

3. The retaining device of claim 2, wherein one of the pin and the cushioning member abuts against the slider and the other one of the pin and the cushioning member abuts against the retaining assembly.

4. The retaining device of claim 2, wherein the cushioning slot has a progressively larger width in a moving direction of the pin.

5. The retaining device of claim 2, wherein the cushioning member has a symmetrical U-shaped structure and comprises a pair of the holes on each side and a pair of the cushioning slots on each side.

6. The retaining device of claim 1, wherein the predetermined value is between 1000N and 5000N.

7. The retaining device of claim 1, wherein the cushioning assembly comprises a cushioning member located in front of the slider in a cushioning direction of the slider, the cushioning member being configured to collapse when the impact force from the slider reaches the predetermined value.

8. The retaining device of claim 1, wherein the cushioning assembly comprises a snap fixed to the retaining assembly, the snap being configured to be disengaged from the retaining assembly when the impact force from the slider reaches the predetermined value.

9. The retaining device of claim 1, wherein the cushioning assembly comprises a cushioning member and a stopper abutting against the cushioning member, the stopper being configured to be deformed to release the slider when the impact force from the slider reaches the predetermined value.

10. The retaining device of claim 1, wherein the cushioning assembly comprises a cushioning member, an electronic lock for locking the cushioning member and a detection assembly for detecting an impact force and/or acceleration, the cushioning member abutting against the slider, the electronic lock being configured to release the cushioning member when the impact force and/or acceleration detected by the detection assembly reaches the predetermined value.

11. The retaining device of claim 1, wherein the cushioning assembly comprises a collapsing member configured to be deformed plastically when the impact force from the slider reaches the predetermined value, and
wherein the cushioning assembly further comprises a cushioning member abutting against the slider, and the collapsing member has a U-shaped structure with one end fixed to the cushioning member and the other end fixed to the retaining assembly.

12. The retaining device of claim 1, wherein the cushioning assembly comprises a torn member having a torn piece, the torn piece being configured to be torn from the torn member when the impact force from the slider reaches the predetermined value.

13. The retaining device of claim 1, wherein the cushioning assembly comprises a cushioning member abutting against the slider, the cushioning member being configured to be deformed when the impact force from the slider reaches the predetermined value.

14. The retaining device of claim 1, wherein the cushioning assembly comprises a cushioning member and a protrusion fixed to the retaining assembly and in interference fit with the cushioning member, the cushioning member abutting against the slider and being configured such that the protrusion slides on the surface of the cushioning member to provide damping when the impact force from the slider reaches the predetermined value, and
wherein the protrusion has an arcuate surface and the cushioning member has a wavy surface abutting against the arcuate surface.

15. The retaining device of claim 1, wherein the cushioning assembly is configured such that the slider stops at the second position after moving from the first position to the second position.

16. The retaining device of claim 1, wherein the slider is provided with a plurality of positioning holes, and the fastening rod is configured to be selectively inserted into one of the positioning holes to select the position of the base support assembly with respect to the retaining assembly, and
wherein the retaining device further comprising an operative member provided on the base support assembly, the operative member being configured to drive the fastening rod into or out of the positioning holes, the operative member, the fastening rod and the slider forming an adjustment assembly.

17. The retaining device of claim 1, wherein the retaining assembly comprises a pair of retaining rods, and the cushioning assembly is provided within at least one of the retaining rods.

18. The retaining device of claim 17, wherein the retaining assembly further comprises locking members attached to ends of the retaining rods respectively and configured to lock the base to the vehicle seat.

19. A base for supporting a carrier, the base comprising a retaining device, wherein the retaining device comprises:
a base support assembly connected to and supporting the base;
a retaining assembly configured to secure the carrier to a vehicle seat, the retaining assembly comprising a retaining rod;
a slider received in the retaining rod;
a fastening rod provided on the base support assembly and configured to be operatively engaged with or disengaged from the slider, wherein when the fastening rod is engaged with the slider, movement of the base support assembly relative to the slider is restricted,
and when the fastening rod is disengaged from the slider, the base support assembly is movable relative to the slider so that a position of the base support assembly with regard to the retaining assembly is adjustable; and
a cushioning assembly arranged in the retaining rod, and abutting against an end of the slider,
wherein the slider is arranged at a first position in the retaining rod until an impact force from the slider applied to the cushioning assembly reaches a predetermined value, and the cushioning assembly is configured to allow the slider to slide in the retaining rod from the first position to a second position when the impact force from the slider applied to the cushioning assembly reaches or exceeds the predetermined value, and provide damping for the sliding of the slider a between the first position and the second position.

20. A carrier, comprising a safety seat, wherein the safety seat comprises a base, and the base comprising a retaining device, and wherein the retaining device comprises:
a base support assembly connected to and supporting the base;
a retaining assembly configured to secure the carrier to a vehicle seat, the retaining assembly comprising a retaining rod;
a slider received in the retaining rod;
a fastening rod provided on the base support assembly and configured to be operatively engaged with or disengaged from the slider, wherein when the fastening rod is engaged with the slider, movement of the base support assembly relative to the slider is restricted,
and when the fastening rod is disengaged from the slider, the base support assembly is movable relative to the slider so that a position of the base support assembly with regard to the retaining assembly is adjustable; and
a cushioning assembly arranged in the retaining rod, and abutting against an end of the slider,
wherein the slider is arranged at a first position in the retaining rod until an impact force from the slider applied to the cushioning assembly reaches a predetermined value, and the cushioning assembly is configured to allow the slider to slide in the retaining rod from the first position to a second position when the impact force from the slider applied to the cushioning assembly reaches or exceeds the predetermined value, and provide damping for the sliding of the slider between the first position and the second position.

* * * * *